Sept. 25, 1973     D. J. BROMER ET AL     3,761,374

PROCESS FOR PRODUCING AN IMPROVED CUTTING TOOL

Filed July 9, 1971

United States Patent Office 3,761,374
Patented Sept. 25, 1973

3,761,374
PROCESS FOR PRODUCING AN IMPROVED CUTTING TOOL
David J. Bromer, Watertown, and Aiyaswami S. Sastri, Stow, Mass., assignors to The Gillette Company, Gillette Park, Boston, Mass.
Filed July 9, 1971, Ser. No. 161,160
Int. Cl. B26b 21/54; C23c 15/00
U.S. Cl. 204—192
8 Claims

ABSTRACT OF THE DISCLOSURE

The sharpened edge of a cutting implement such as a razor blade is modified by subjecting the cutting edge to ion bombardment to modify the tip geometry of the cutting edge and concurrently depositing edge strengthening material on the cutting edge. This concurrent tip modification and deposition process produces an implement with a cutting edge average tip radius of less than about 400 angstroms while increasing the facet width in the immediate vicinity of the cutting edge (for example at a distance of 6,000 angstroms from the tip) a substantial amount by the deposition of strengthening material thereon.

SUMMARY OF INVENTION

This invention relates to processes for producing an extremely sharp and durable cutting edge on a razor blade or similar cutting tool, and to improved cutting tools.

The forming of the cutting edges of razor blades by mass production techniques conventionally involves a series of abrading operations (grinding and honing) to produce the desired sharp and durable shaving edge. Each abrading operation forms a facet on the blade edge being sharpened, which facet is modified by subsequent abrading operations of increasing fineness. In general, the blade edge configuration is a wedge shape, the included solid angle of which is typically 20°–30°. The faces or sides of such cutting edges may extend back from the ultimate edge a distance up to as much as 0.1 inch or even more. Each face need not be a single uninterrupted continuous surface or "facet," but may consist of two or more "facets" formed by successive grinding or honing operations and intersecting each other along zones generally parallel to the ultimate edge. The final facet, i.e. the facet immediately adjacent the ultimate edge, has a width as low as 7.5 microns or even less compared with the diameter of beard hair which averages about 100 to 125 microns. Through shave test evaluation and measurement of the geometry of such sharpened cutting edges, it has been found that the cutting edge should have an average tip radius of less than 500 angstroms. A thin adherent layer of a corrosion resistant metal is often applied to the cutting edge of the blade. Further, a shave facilitating layer of polymeric material is also frequently applied to the blade edge. These layers must have adhesion compatability so that they remain firmly adhered to one another and to the substrate throughout the life of the cutting tool and desirably provide characteristics such as improved hardness and/or corrosion resistance while not adversely affecting the edge geometry.

It is a general object of this invention to provide novel and improved cutting implements, the cutting edges of which have improved mechanical properties.

Another object of the invention is to provide novel and improved processes for producing improved cutting tools.

A further object of the invention is to provide novel and improved processes for producing razor blades which possess superior shaving properties.

In accordance with the invention, the edge geometry of a cutting implement such as a razer blade is modified by a process which includes the steps of forming a cutting edge by a suitable procedure such as grinding, honing, stropping, chemical etching, electrolytic sharpening, or forming with an appropriately shaped die; disposing the cutting implement in a vacuum chamber with a source of strengthening material; then subjecting the cutting edge to concurrent ion bombardment so that a portion of the underlying cutting edge substrate material is removed and energizing the source concurrently with the substrate ion bombardment step to transfer a substantial amount of strengthening material for deposit on the flanks of the edge. The resulting cutting edge of the implement has an average tip radius of less than about 500 angstroms, and the W6 facet width (the facet width at a distance of 6,000 angstroms from the tip) is increased by at least about 400 angstroms. While ion bombardment may be carried out by a variety of techniques, such as DC, AC or RF procedures and the strengthening material may be deposited by various techniques such as evaporation, sputtering or electron beam processes, it is preferred to sputter the source while applying a DC negative bias to the cutting implement. The negative bias is correlated with the deposition rate and in particular embodiments at least 1000 volts have been desirable for practical results. The material on the flanks of the cutting edge increase the mechanical strength of the implement without impairment of cutting effectiveness.

In preferred embodiments, the corrosion resistant strengthening material is deposited by a sputtering technique on a multiplicity of blade elements while the blade edges are disposed in parallel alignment with one another and in a plane parallel to a target member spaced from the blade edges. A planar target member is used in one embodiment while a cylindrical target rod is used in another embodiment.

A razer blade manufactured in accordance with the invention has an average tip radius of less than 500 angstroms, and substantial added strengthening metal, such as chromium or a chrome-platinum alloy, is on the flanks of the cutting edge. Such razor blades exhibit excellent shaving characteristics and have long shaving life. A wide range of blade substrate materials may be used, specific razor blade steel compositions with which the invention may be practiced including the following:

COMPOSITION IN PERCENT

| C | Cr | Mo | Si | Ni |
|---|---|---|---|---|
| 1.25 | .2 | | .2 | |
| 1.00 | 6.0 | | 1.4 | |
| .96 | 13.9 | | .3 | |
| .65 | 10.5 | 1.0 | .3 | |
| .58 | 14.0 | | .3 | |
| .40 | 13.5 | 1.25 | .3 | |
| .09 | 17.0 | .70 | 1.2 | 8.0 |

Other objects, features and advantages of the invention will be seen as the following description of particular embodiments progresses, in conjunction with the drawings in which.

DESCRIPTION OF PARTICULAR EMBODIMENT

Figure 1:
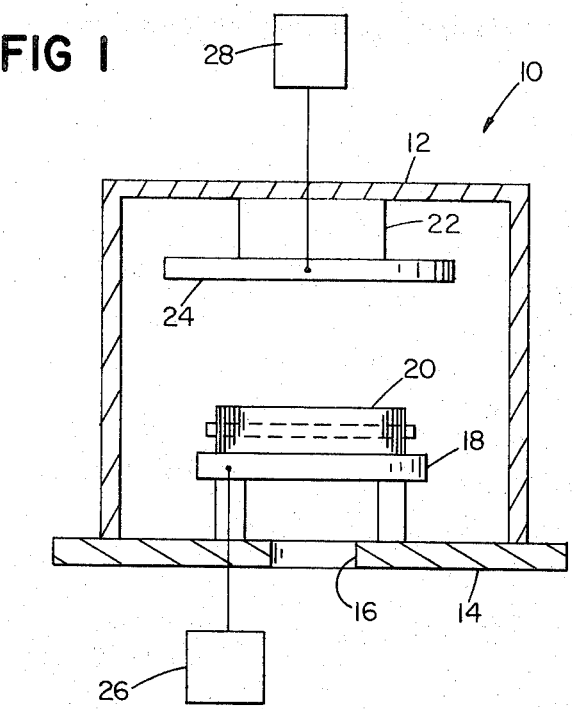
FIG. 1 is a diagrammatic view of apparatus suitable for practice of the invention.

Diagrammatically shown in FIG. 1 is a sputtering apparatus which includes a stainless steel chamber 10 having wall structure 12 and a base 14 in which is formed a port 16 which is coupled to a suitable vacuum system (not shown). Mounted in chamber 10 is a support 18 on which is disposed a stack of razor blades 20 and support structure 22 for target member 24. Support structures 18 and 22 are electrically isolated from chamber 10 and electrical connections are provided to connect blade stack 20 and target 24 to appropriate energizing apparatus 26, 28. It will be understood that this is a diagrammatic showing of suitable apparatus. In one embodiment the target 24 is a horizontally disposed disc, six inches in diameter and one-quarter inch thick; and 4½-inch long stack of blades 20 is placed on a five-inch diameter aluminum support disc 18 disposed parallel to target disc 24. A coil of razor blade strip may be similarly positioned on such a support with its sharpened edges defining a plane exposed to parallel to target 24. In another embodiment, a target rod that has an exposed length of twenty-nine inches and is 1¼ inches in diameter is employed. Suitable coolant is circulated through the rod for cooling purposes. A series of stacks of razor blades (either in coil form or in twelve inch long axial extending stacks) are disposed about the target rod at equal distances therefrom.

Figure 2:
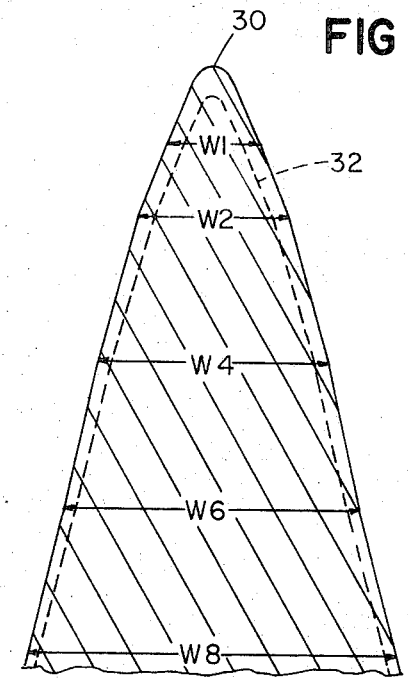
FIG. 2 is a diagrammatic view of the geometry of a razor blade edge sharpened by conventional means.

The geometry of the edge of a typical razor blade of commercial quality sharpened by conventional abrading techniques is shown in FIG. 2 at a magnification of about 100,000 times. The tip 30 has a radius that is typically in the range of 125–500 Angstroms, a typical average radius (the average of radius measurements taken at 5 to 10 points along the length of the blade edge) being about 250 Angstroms. The W1 flank width (at a distance of 1,000 Angstroms from the ultimate edge 40) is typically in the range of 1200 to 1400 Angstroms; the W2 width (at a distance of 2,000 Angstroms from the tip 30) is about 2100 Angstroms; the W4 width (at a distance of 4,000 Angstroms from the tip 30) is about 3200 Angstroms; the W6 width (at a distance of 6000 Angstroms) is about 4100 Angstroms; and the W8 width (at a distance of 8,000 Angstroms from the tip) is about 5100 Angstroms.

These measurements were made by a high resolution electron microscopy technique in which a magnified image of a blade edge profile (silhouette) is photographed. The blades are cleaned by immersion in trichloroethylene; subjection to ultrasonic cleaning for two minutes; rinsing in a mixture of one-half acetone and one-half methanol; cleaned in warm air; and then demagnetized in a solenoid coil. A blade specimen in the order of one square millimeter in size with four sides, one of which is the original sharpened razor blade edge, is obtained by abruptly snapping the blade with the help of a suitable instrument such as a watchmaker's plier. The blade may be snapped in air or if the blade will not break readily in liquid nitrogen (at a temperature below the ductile to brittle transition value).

A 100 k.v. RCA EMU4 electron microscope is used with a standard air lock specimen holder modified to accommodate the small blade edge fragment. The microscope was fitted with a liquid nitrogen cooled baffle valve to reduce contamination during photography. The blade edge profile is held in the path of the electron beam so that a shadow image of the ultimate tip is cast on the final viewing screen. The magnification of the final image is controlled by the strength of the intermediate lens current and the focusing is achieved with control of the objective lens current. The microscope magnification was calibrated in terms of focusing lens current.

The tip radius of the resulting photomicrograph was measured by fitting 90° arcs of circles to the tip profile and selectign as the tip radius that edge profile that best fits the profile of the photomicrograph. The point to point resolution of the microscope is in the order of 5 Angstroms. The variation in average radius of a large number of edges from a particular batch of blades using this technique was within ±12.5 Angstroms. The W1, W2 and other dimensions are similarly measured from the photomicrograph.

Figure 3:
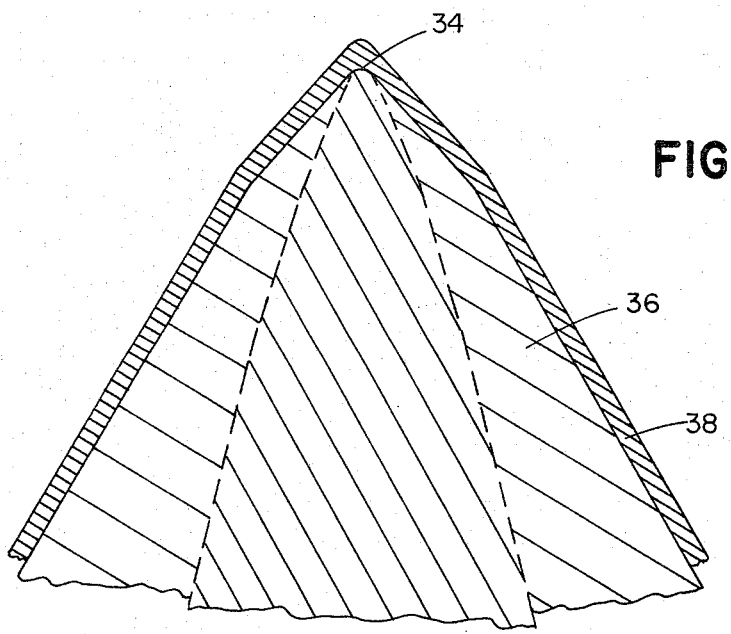
FIG. 3 is a diagrammatic view illustrating one example of razor blade edge geometry processed in accordance with the invention.

In operation of the apparatus shown in FIG. 1, sharpened blades 20 are disposed in a stack with their sharpened edges aligned and are placed in chamber 10 on support 18. The chamber is evacuated and an RF potential is applied to target 24 to produce argon ions which bombard target 24 and release atoms of the target material. Concurrently, the blade edges are subjected to ion bombardment, for example by a glow discharge which, if maintained without concurrent sputtering of target 24, will modify the edge geometry as generally indicated by line 32 in FIG. 2 and specifically to reduce the tip radius, a typical radius reduction being about 100 Angstroms. The released atoms of target material, however, are concurrently deposited on exposed surfaces, including the sharpened blade edges. The resulting blades have a cutting edge geometry of the nature diagrammatically indicated in FIG. 3 in which the tip 34 has an average radius of about 250 Angstroms and a layer 36 that tapers in thickness is on the flanks, the W6 dimension of the substrate and layer 36 in a typical process being about 800 Angstroms.

As a specific example, a 4½-inch long stack of stainless steel razor blades having the following composition:

|  | Percent |
|---|---|
| Carbon | .54–.62 |
| Chromium | 13.5–14.5 |
| Manganese | .20–.50 |
| Silicon | .20–.50 |
| Phosphorus, max. | .025 |
| Sulphur, max. | .020 |
| Nickel, max. | .50 max. |
| Iron | Remainder | and sharpened to the edge geometry as indicated in FIG. 2, were placed on a five-inch diameter aluminum disc support 18 in an RF sputtering unit. The target 24 was a pure chromium disc six inches in diameter and ¼ inch thick. The disc surface was disposed parallel to the sharpened blade edges at a distance of 2½ inches from those edges.

Pressure in the vacuum chamber 10 was reduced to 0.1 micron of mercury and then pure argon gas was bled into the chamber to a pressure of thirty microns of mercury. The aluminum support disc 18 was then connected to a DC source of power and with the chamber 10 grounded the blade edges were subjected to ion bombardment at a voltage of 1800 volts and a current of 35 milliamperes for seven minutes. The target 24 was covered by a metal shield during this step. The target was then similarly subjected to ion bombardment for five minutes. The shield was then removed from between the blades 20 and the target 24, the aluminum disc was connected to a 2,000-volt negative DC source of power and the target was connected to a 13.56 megahertz RF source. 0.8 kilowatts of RF power (with a DC negative bias of about 3400 volts and a superimposed RF signal of about 4500 volts peak to peak) was applied with the DC voltage on the blades for ten minutes in a simultaneous shaping and depositing operation. At the end of the ten-minute period, the blades had an average tip radius of about 100 Angstroms and there was a layer 36 of chromium deposited on the flanks of the cutting edge to a thickness of about 2,000 Angstroms on each side at a distance of 6,000 Angstroms from the tip. A coating of polytetrafluoroethylene telomer was then applied to the edges of the blades in accordance with the teaching in U.S. Pat. 3,518,110. This processing involved heating the blades in an argon environment and provided on cutting edges of the razor blades an adherent coating of solid PTFE. These blades exhibited excellent shaving properties and long shaving life.

As a second example, a stack of blades was similarly processed employing a target 24 of chrome-platinum. The target 24 was a pure chromium disc six inches in diameter and ¼ inch thick that had squares of pure platinum foil one centimeter on a side and 0.002 inch thick spot welded on its surface. The foil squares were spaced on the surface so that 23% of the chromium surface was covered with platinum. The blade stack was initially subjected to DC ion bombardment for seven minutes and target was then subjected to ion bombardment for five minutes. The aluminum disc was then connected to a 2,000-volt negative DC source of power and the target was connected to a 13.56 megahertz RF source. 0.8 kilowatt of RF power (with a DC negative bias of about 3400 volts and a superimposed RF signal of about 4500 volts peak to peak) was applied with the DC voltage on the blades for ten minutes in a simultaneous shaping and depositing operation. At the end of the ten-minute period, the blades had an average tip radius of about 100 Angstroms and there was a layer 36 of chromium-platinum alloy deposited on the flanks of the cutting edge to a thickness of about 2,000 Angstroms on each side at a distance of 6,000 Angstroms from the tip. The DC voltage on the blades 20 was then turned off and the RF power on the target was reduced to 0.4 kilowatt. Sputtering continued for seventy-five seconds to deposit a layer 38 of chromium-platinum alloy of about 250 Angstroms in thickness on the modified blade edges. The resulting blades have a tip geometry of the type shown in FIG. 3, an average tip radius of about 200 Angstroms, and a typical W6 dimension of about 8500 Angstroms. A coating of polytetrafluoroethylene telomer was then applied to the edges of the blades in accordance with the teaching in U.S. Pat. 3,518,110. This processing involved heating the blades in an argon environment and provided on cutting edges of the razor blades an adherent coating of solid PTFE. These blades exhibited excellent shaving properties and long shaving life.

It will be understood that a variety of materials other than the specific pure chromium or chrome-platinum alloy may be used to form layers 36 and 38.

The invention provides an improved cutting implement such as a razor blade in which the tip radius of the implement is within the optimum range for cutting effectiveness, and substantial amounts of edge strengthening materials have been added to the flanks of the cutting edge.

While a particular embodiment of the invention has been shown and described, various modifications thereof will be apparent to those skilled in the art and therefore it is not intended that the invention be limited to the disclosed embodiment or to details thereof and departures may be made therefrom within the spirit and scope of the invention.

What is claimed is:

1. A process for treating a cutting implement comprising the steps of forming a cutting edge on the implement having an average tip radius of less thin about 500 Angstroms, disposing said implement in a vacuum chamber with a source of edge strengthening material, subjecting said implement to an initial in bombardment step to reduce the average tip radius about 100 Angstroms to modify the tip geometry of said cutting edge and energizing said source concurrently with a further ion bombardment step to transfer strengthening material from said source for deposit on the flanks of said cutting edge adjacent said tip to a total thickness at the W6 dimension of at least 400 Angstroms, the resulting modified cutting edge having an average tip radius of less than 500 Angstroms.

2. The process as claimed in claim 1 wherein said strengthening material is deposited by sputtering.

3. The process as claimed in claim 1 wherein said strengthening material is deposited by a sputtering technique on a multiplicity of razor blade elements while the blade edges are disposed in parallel alignment with one another and in a plane parallel to a source member spaced from said blade edges.

4. The process as claimed in claim 3 wherein said razor blade elements are connected to a negative DC source and said source is concurrently connected to a high frequency source.

5. The process as claimed in claim 4 wherein the potential of said negative DC source is at least 1000 volts.

6. The process as claimed in claim 3 including the step of disconnecting said DC source from said razor blade elements after said W6 dimension has been increased in the range of at least about 400 Angstroms and continuing to transfer strengthening material from said source for deposit on said cutting edges to form a layer of strengthening material having a thickness of at least about 50 Angstroms.

7. The process as claimed in claim 6 wherein said strengthening material includes chromium.

8. The process as claimed in claim 1 including the further step of terminating said ion bombardment after said W6 dimension has been increased in the range of at least about 400 Angstroms and continuing to transfer strengthening material from said source for deposit on said cutting edge to form a layer of strengthening material having a thickness of at least about 50 Angstroms at the tip of said cutting edge.

References Cited
UNITED STATES PATENTS

| | | | |
|---|---|---|---|
| 2,843,542 | 7/1958 | Callahan | 204—192 |
| 3,345,202 | 10/1967 | Kiss et al. | 74—106 R |
| 3,480,483 | 11/1969 | Wilkinson | 204—192 |
| 3,682,795 | 8/1972 | Fischbein et al. | 204—192 |
| 3,562,140 | 2/1971 | Skinner et al. | 204—298 |
| 3,479,269 | 11/1969 | Brynes et al. | 204—192 |
| 3,652,443 | 3/1972 | Fish et al. | 204—192 |

JOHN H. MACK, Primary Examiner

S. S. KANTER, Assistant Examiner

U.S. Cl. X.R.

30—346.55; 74—106 R

UNITED STATES PATENT OFFICE
CERTIFICATE OF CORRECTION

Patent No. 3,761,374      Dated October 30, 1973

Inventor(s) David J. Bromer et al.

It is certified that error appears in the above-identified patent and that said Letters Patent are hereby corrected as shown below:

Column 3, line 69, change "selectign" to --selecting--;

Column 5, line 56, change "in" to --ion--.

Signed and sealed this 11th day of June 1974.

(SEAL)
Attest:

EDWARD M. FLETCHER, JR.
Attesting Officer

C. MARSHALL DANN
Commissioner of Patents